Nov. 4, 1924.

J. ARNER

1,513,879

TRANSMISSION

Filed March 6, 1924   5 Sheets-Sheet 3

Inventor
Joseph Arner

Nov. 4, 1924.

J. ARNER

TRANSMISSION

Filed March 6, 1924

Inventor
Joseph Arner

Patented Nov. 4, 1924.

1,513,879

UNITED STATES PATENT OFFICE.

JOSEPH ARNER, OF WASHINGTON, DISTRICT OF COLUMBIA.

TRANSMISSION.

Application filed March 6, 1924. Serial No. 697,327.

*To all whom it may concern:*

Be it known that I, JOSEPH ARNER, a citizen of the United States, residing at Washington, in the District of Columbia, have invented certain new and useful Improvements in Transmissions, of which the following is a specification.

This invention relates to transmissions and more particularly to a transmission which is continuously variable from a desired reverse speed through a neutral point to a desired high speed.

A further object of the invention is to provide a simple and readily constructed device of this character in which the speed transmission is obtained by rotating a plurality of racks or toothed members about a gear and during the rotation of these members applying thereto a reciprocating action, during which reciprocation they are intermittently engaged with the gear with the result that the gear is driven in a direction and with a speed determined by the length of the reciprocation and the period of engagement as will hereinafter be more fully set forth.

A further object of the invention is to provide means whereby the racks may simultaneously be thrown out of engagement with the gear thus disconnecting the gear from the drive as for emergency purposes.

A still further object of the invention is to provide means whereby the disengagement of the racks from the gear may be discontinued when the highest speed transmission is effected, thereby assuring a direct drive between the motive agent and the driven shaft.

A further object of the invention is to provide a transmission eliminating all necessity for a clutch, all operative features of the transmission being embodied directly in the transmission.

These and other objects I attain by the construction shown in the accompanying drawings, wherein for the purpose of illustration is shown a preferred embodiment of my invention and wherein:—

Referring now more particularly to the drawings, the numeral 10 indicates a driving shaft which may be propelled in any suitable manner and 11 a driven shaft. The driving shaft has mounted upon one end thereof for rotation therewith a sleeve 12 having extending radially therefrom a slotted arm 13. The driving shaft does not extend entirely through this sleeve but only partially and the portion of the sleeve unoccupied by the driving shaft forms a bearing for the forward end of the driven shaft 11 as shown. This sleeve is rotatably mounted in a hub portion 14 formed in one side of the casing, the arm 13 being arranged within the casing and at the opposite side of the casing the shaft 11 is mounted in a similar hub 14ª. This casing is preferably oil-tight so that all portions of the mechanism hereinafter described lying within the casing may be run entirely submerged in oil.

Within the casing at opposite sides thereof and surrounding the shaft 11 are disposed a pair of bearing rings 15, each of these bearing rings having diametrically aligned outwardly extending flanges 16 operating in channels 17 formed in the inner wall of the casing. One of the flanges 16 of each bearing ring 15 projects through the wall of the casing, as at 18, and has secured thereto an eccentric yoke 19. The wall of the casing having the openings 18 therein is provided with standards 20 in which a shaft 21 is rotatably mounted. This shaft has secured thereto eccentrics 22 engaging the yokes 19 and a gear 23 or the like whereby it may be rotated. It will be seen by an inspection of the drawings that through this mechanism the bearing rings 15 may be moved from a position where they are concentric with the shaft 11 to varying degrees of eccentricity to such shaft.

The bearing rings form the mounting for frame rings 24 of a framework, generally indicated at 25, balls 26 being disposed between the bearing ring 15 and frame ring 14 to reduce the friction between these elements. Each bearing ring has an outstanding flange in which are secured the ends of spacing bolts 27 and about these bolts between the flanges of the rings are mounted sleeves 28. It will be seen that as the bearing rings 15 are shifted the entire framework 25 is shifted therewith. With one of the spacing bolts 27 the slotted arm 13 is engaged, the bolt being directed through the slot of the arm so that as the shaft 10 is rotated this rotation will be imparted to this framework, the slot permitting the necessary variation of eccentricity. The wall of the casing about the boss 14ª thereof is formed interiorly to provide a chamber 29 within which is mounted a bearing ring 30 of a desired width. This bearing ring has mounted therein and supported thereby a sleeve 31, the sleeve being supported by spaced rows of thrust balls 32 arranged between the bearing ring and sleeve. The end of this sleeve projects considerably beyond the forward end of the bearing ring and the sleeve between the rows of thrust bearings is formed with a stop shoulder 33ª.

Figure 1:
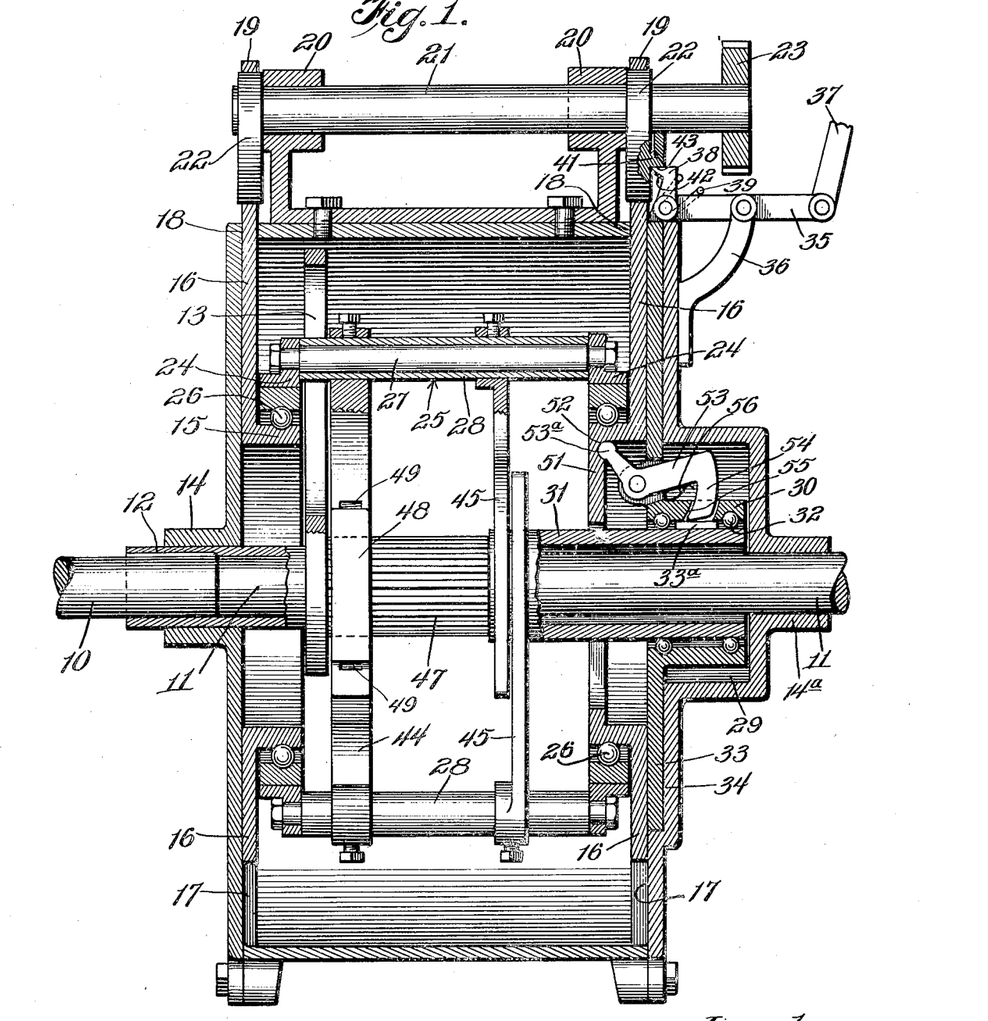
Figure 1 is a vertical sectional view through a transmission constructed in accordance with my invention, the frame and control sleeve being shown in concentric relation.
Figure 2:
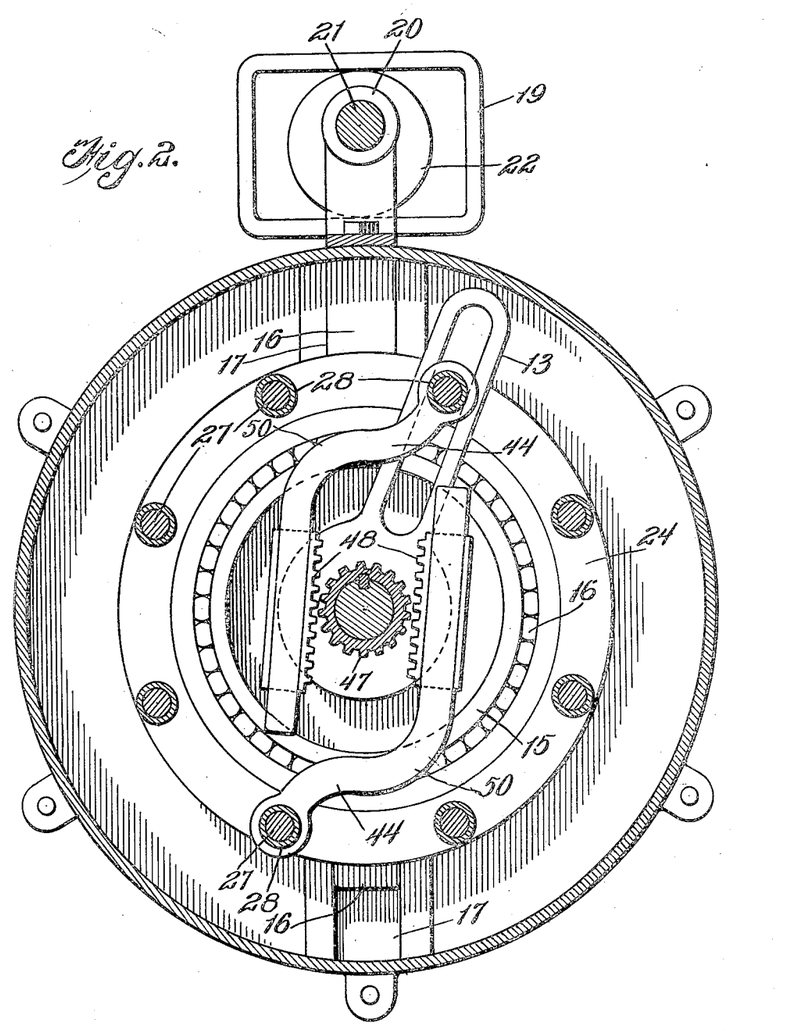
Figure 2 is a vertical section taken at right angles to the section in Figure 1 centrally of the transmission and looking toward one end thereof.
Figure 3:
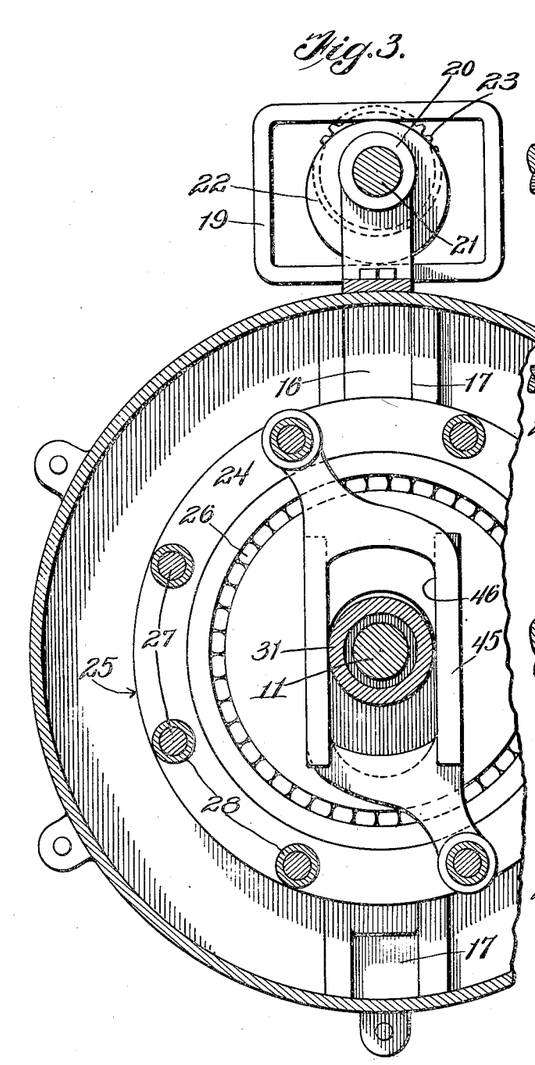
Figure 3 is a similar section looking toward the opposite end thereof.
Figure 4:
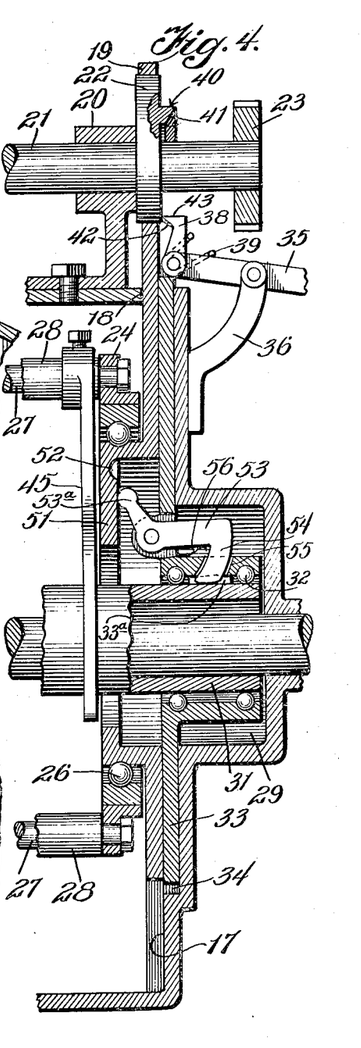
Figure 4 is a fragmentary section, a similar section shown in Figure 1, the parts being shown in the eccentric position.

The normal position of this bearing ring is eccentric to the shaft 11 and the sleeve 31 is concentric with this bearing ring so that it is likewise eccentric to the shaft 11. This eccentricity is maintained through flanges 33 formed upon the bearing ring and operating in channels 34 formed in the wall of the casing and extending diametrically of the bearing ring and aligned with the channels 17 of the flanges 16. In fact, the channels 34 are formed in the base of the channels 17 as more clearly shown in Figure 4. Through the wall of the casing in which the openings 18 or the flanges 16 are formed extends one of these flanges 33 and the end of this flange is pivoted to one end of a lever 35 an intermediate portion of which is pivoted upon a bracket 36 carried by the casing. The opposite end of this lever has attached thereto a suitable operating rod 37. It will be seen that by shifting this operating rod the sleeve and bearing ring may be moved with relation to the shaft, this movement being such that in the normal position of the ring the sleeve is eccentric to the shaft 11, but this sleeve may be moved to a position where it is concentric to the shaft 11. In order that the sleeve may be held in the last named position, which may be described as an emergency position, I pivot upon the pivotal connection of the lever 35 and flange 33 a latch 38. This latch operates against the face of the adjacent eccentric 22 and is yieldably held against this face by means of a spring 39. The face of the eccentric has extending upwardly therefrom a concentrically arranged rib 40, this rib having its upper face inclined as indicated at 41. The rib is of such extent that when the inclined end thereof is aligned with the latch 38 the frame 25 is disposed at the neutral position or at a position where there is no transmission of power from the shaft 10 to the shaft 11. The face of the latch 38 next adjacent the eccentric 22 is provided with an inclined face 42 coacting with the inclined face 41 of the flange, these faces acting to wedge the latch member outwardly and permit the lever to occupy the emergency position. The upper surface of the latch member and the under surface of the flange are flat and disposed at right angles to the path of movement of the lever 37, as indicated at 43, so that once the latch is sprung beneath the flange it cannot be returned until the shaft 21 is rotated to bring the eccentrics 22 to the neutral position.

Secured to each sleeve 28 is a rack arm 44 and a yoke arm 45. The yoke arm 45 has a yoke slot 46 of the same width as the external diameter of the eccentrically disposed sleeve 31 hereinbefore described and these yoke arms are each disposed so that this slot receives this eccentric. The end of the shaft 11 between the end of the eccentric 31 and the adjacent face of the end of the sleeve 12 is provided with a gear 47 with which the racks 48 of the rack arms coact. Since the rack arms are fast to the sleeves 28, as are the eccentric yokes 45, these yokes will impart oscillation to the sleeves which will cause the racks to be thrown out of engagement with the gear 47 through a greater portion of the rotation of the frame 25, the period of engagement being approximately one-third of the perimeter of the gear. Each gear arm has the rack thereof mounted thereon for sliding movement through the width of approximately one tooth, movement of the rack in either direction being opposed by springs 49 thus allowing for a slight shifting of the rack to compensate for inaccuracies of engagement and to prevent clashing of the teeth of the racks with the teeth of the gear. Each rack arm preferably has intermediate its rack 48 and the point of attachment a 45° bend, indicated at 50, so that the tendency of the eccentric movement of the frame is to draw the rack 48 very firmly into engagement with the gear. As many of the racks and yokes may be provided as is found desirable, in the present instance provision having been made for eight racks with their associated yokes. A sufficient number of racks will be provided to prevent the occurence of any periods at which the racks are completely disengaged from the gear except at such time as the sleeve 31 is concentrically positioned with relation to the shaft 11.

Figure 5:
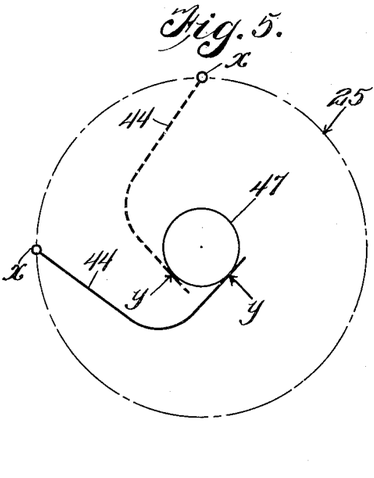
Figures 5 and 6 are diagrammatic views illustrating the operation of the racks upon the gear in the concentric and eccentric positions respectively.
Figure 6:
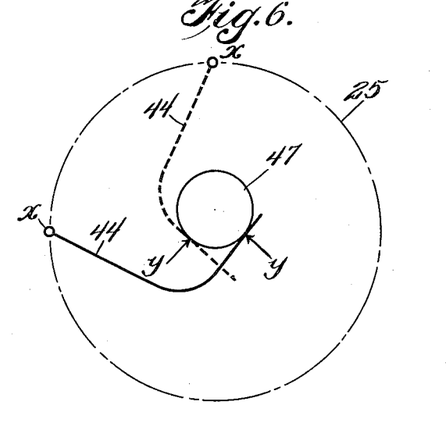
Figure 7:
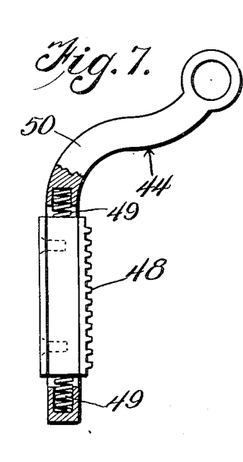
Figure 7 is a side elevation partially broken away of one of the racks.
Figure 8:
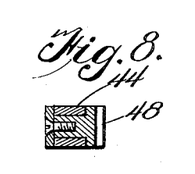
Figure 8 is a transverse section through the racks showing one manner of constructing the same.
Figure 9:
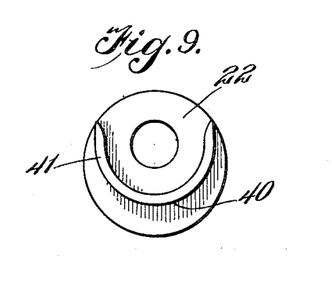
Figure 9 is an end view of the eccentric bearing the locking flange.
Figure 10:
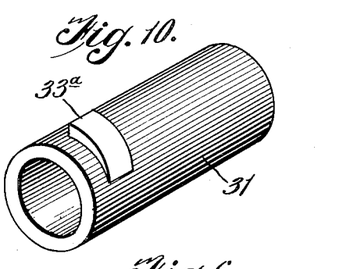
Figure 10 is a perspective view of the control sleeve removed.

It will be seen from an inspection of the diagrammatic views in Figures 5 and 6 by a comparison of these figures that by a construction of this character any desired speed ratio can be obtained between the shafts 10 and 11 from a one to one ratio to a reverse ratio, this being accomplished in the following manner. In the figures above referred to the travel of the arms 44 during their period of engagement, as represented by the frame, is between points X and X upon the dotted line indicating the general contour of the frame. The engagement of the gear C is between points Y and Y on this gear. Assuming that this engagement is, as shown in the accompanying drawings, one-fourth of the periphery of the gear and that the gear has forty-eight teeth, then the rotation about this gear through one-fourth of its periphery accomplishes a rotation of twelve teeth. Between the points X and X, with the frame 25 concentric to the shaft 11 and accordingly to the gear, there is no relative movement of the rack arm 44 and the gear other than the movement imparted by the eccentric yoke 45 which moves the rack of the rack bar into and out of engagement with the gear, in other words, there is no longitudinal movement of the arm 44 upon this gear when these parts are concentric. This being the case, if the rack arm is engaged with the gear through a period of one-fourth of the travel of the frame about the gear, the gear must move with the frame and rack arm with the result that the shaft 11 is rotated through one-fourth of its periphery. Changing the relative positions of the shaft and frame to place the shaft eccentrically to the frame alters this operation.

It will now be obvious that since the rack arms are fixed as to length and since the distance between the point of attachment of these rack arms and the shaft alters between the points X and X, the rack will travel upon the gear with resulting modification of the movement imparted to the gear. If the travel of the rack upon the gear is equal in length to one-fourth of the periphery of the gear or, in other words, equal to twelve teeth, then the gear 11 will remain stationary and the frame will rotate without any effects upon the gear, the teeth of the racks simply meshing with the teeth of the gear as they pass thereabout during the period of engagement. If, however, this eccentricity is such that the travel of the rack upon the gear is more or less than one-fourth of the diameter of the gear, then motion will be transmitted to the gear by the racks. If the racks have but an eleven-tooth travel, the gear will be shifted through one tooth or one-forty-eighth of its circumference and in the same direction of travel as the direction of travel of the frame. If, however, the rack has more than a twelve-tooth travel, as thirteen teeth, then the gear will be rotated in a reverse direction a number of teeth of travel of the rack in excess of twelve or, in the example given above, one tooth or one-forty-eighth of its circumference.

It will be obvious that by varying the eccentricity of the frame to the shaft or the shaft to the frame, the former construction being illustrated in the present instance, very fine proportionate speeds of the shafts 10 and 11 may be obtained. Any desired speed reduction from the shaft 10 may be obtained from the one to one ratio to the reverse ratios. When the lever 35 is actuated to place the eccentric sleeve 31 concentrically with the shaft 11, then all of the racks will be so positioned that they do not engage the gear. Since this can be done instantaneously, it will be obvious that an emergency disconnection is obtainable at any time. It will, of course, be obvious that where the one to one speed ratio is to be maintained through any considerable length of travel, as it would be where the transmission was applied to an automobile, it would be desirable that the shifting of the racks into and out of engagement with the gear be discontinued during such period, for this shifting action necessitates a certain amount of wear upon the gear and racks which would eventually result in their destruction.

In order that this continuous engagement of the racks with the gear during direct driving periods may be attained automatically, I provide upon the bearing ring 15 next adjacent the normally eccentrically disposed bearing ring 30 a transverse member 51 which is provided immediately adjacent its point of connection with the bearing ring and in alignment with the upper flange 33 of the eccentrically disposed bearing ring 30 with a recess 52. Pivotally mounted upon this upper flange 33 for oscillation in a plane radial to the shaft 11 is a bell crank lever 53, one end of which slidably abuts the adjacent surface of the transverse member 51 and the opposite end of which is provided with an angular blade 54 extending through a slot 55 in the bearing ring for engagement with the face of the eccentric sleeve 31. At the point of this engagement the eccentric sleeve is provided upon its periphery with the shoulder 33$^a$ hereinbefore described. When the end 53$^a$ of the lever 53 is engaged with the inner face of the transverse member 51, the angular end portion 54 of this lever is forced through the slot and engages firmly against the wall of the cam and is abutted by this shoulder insuring against rotation of the cam by the drag imparted thereto by the eccentric yokes 45 which are rotated about the eccentric sleeve by the frame 25. When, however, the end portion 53$^a$ engages in the recess 52, the angular portion 54 of this lever is withdrawn from engagement with this shoulder and with the eccentric sleeve 31 by a spring 56 with the result that the eccentric sleeve is free to rotate under this drag and accordingly those racks which are in mesh with the gear will remain in mesh with the gear. This recess 52 is so positioned that the end portion 53$^a$ of the lever 53 only enters the same when the frame 25 is concentric to the shaft 11. It will thus be seen that placing the frame 25 in the high speed or one to one ratio position automatically releases the eccentric sleeve and causes those racks which may be engaged with the gear to remain in engagement therewith.

In the form shown in Figures 11 to 14 the structure hereinbefore set forth is somewhat modified while the principle of operation is the same. In this form 57 and 58 designate the driving and driven shafts respectively, the driving and driven shafts having a bearing connection one with the other as indicated. Mounted in the casing and surrounding the driven shaft is a bearing member or housing 59 supported from the casing as by lugs 60 having pins 60$^a$ operating in grooves or slots 60$^b$ formed in the wall of the casing so that the bearing member may be slid longitudinally of the casing and, as hereinafter more fully disclosed, at one end of its movement moved diametrically of the casing. This bearing member has projecting inwardly from its rear wall a concentric tube 59$^a$ surrounding the shaft and having its rear end restricted in diameter as indicated at 59$^b$ The internal diameter of this restricted portion is greater than the external diameter of the driven shaft 58 so that diametrical movement of the bearing member above mentioned may be had. This bearing member or housing normally has its inner face disposed eccentrically to the shaft but when shifted diametrically may be moved concentrically to the shaft and supports a sleeve 61 through the medium of thrust balls 63. This sleeve is concentric with the housing and accordingly concentric with the tube 59$^a$, and between this tube and housing an annular channel 64 is provided which is not only eccentric to the shaft 58 but which when the housing is shifted diametrically becomes concentric to the shaft 58. The rear end of the sleeve has its internal diameter reduced, as at 65, to correspond to the reduction of the internal diameter of the tube 59$^a$. It will be noted that the channel 64 is accordingly of the same width throughout its length but is offset toward the shaft and reduced in actual diameter at its rear end. Operating in this channel 64 are the heads 66 of rack members 67 hereinafter to be more particularly described. Adjacent the forward end of the eccentric member the shaft 58 has secured thereto a spiral gear 68 with which the racks 67 coact, it being, of course, understood that the teeth of the racks are constructed to coact with this gear.

Figure 11:
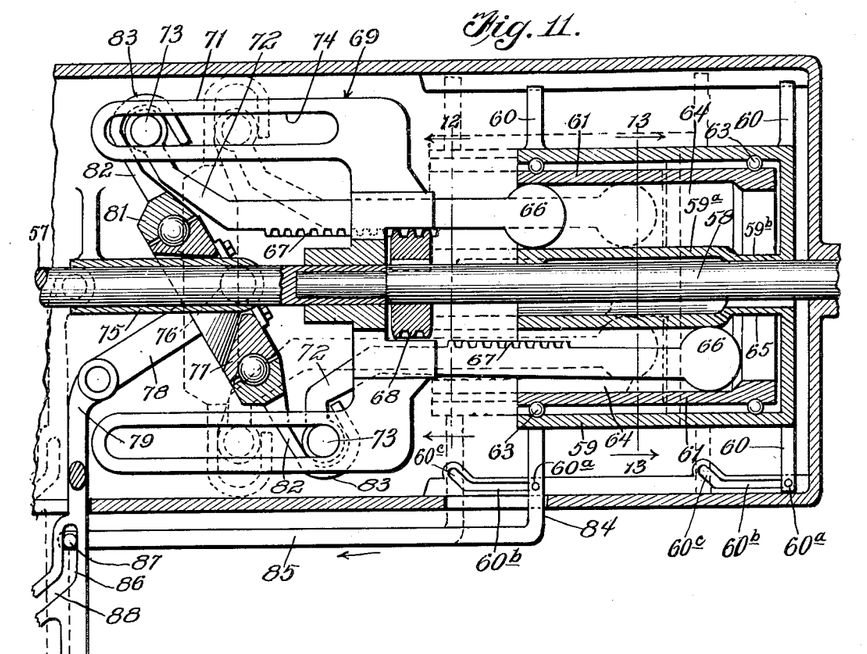
Figure 11 is a longitudinal sectional view taken through a modified construction of the transmission.
Figures 12, 14:
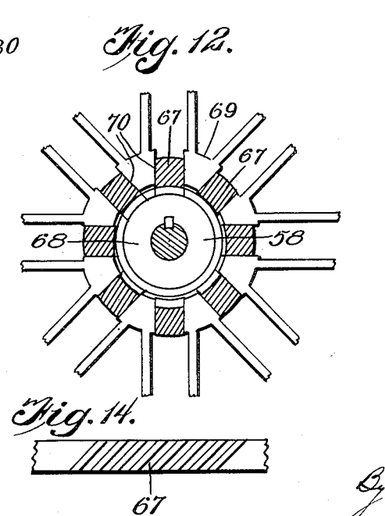
Figure 12 is a section on the line 12—12 of Figure 11.
Figure 14 is a bottom face view of one of the racks employed in this form of construction.
Figure 13:
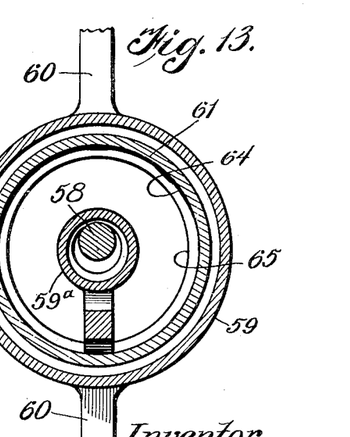
Figure 13 is a section taken on the line 13—13 of Figure 11.

The numeral 69 designates a frame secured to and carried by the drive shaft 57 immediately adjacent the rear end thereof, this frame having slots 70 through which the racks 67 operate corresponding in number and arrangement to the channels 64 of the eccentric member 59$^a$. At each side of each of these slots the frame 69 is provided with a forwardly extending arm 71 paralleling the shaft 57 and overlying the same. Each rack 67 has an outwardly extending portion 72 the terminal portion of which is disposed between the arms 71 projecting from the sides of its particular slot and has at its ends a transversely extending pin 73 operating in slots 74 formed in these arms.

The shaft 57 adjacent its rear end is supported by bearing 75 which projects beneath the ends of the arms 71 and is there provided with a pair of diametrically opposed bearing studs 76. On these studs is mounted a circular member 77 having secured thereto a pair of arms 78 which are engaged by the forked ends 79 of a shifting rod 80. Through this shifting rod this circular member 77 may be shifted from a position where it is at right angles to the axis of the shaft 57 to a desired angular position. This member forms the inner half of a ball bearing the outer half of which is formed by an annulus 81 having outwardly projecting arms 82 the ends of which are hooked over the extremities of the racks 67 as at 83.

When the member 77 is at right angles to the shaft 57 it will be obvious that these arms operate in a fixed plane and there is no longitudinal movement of the racks 67 caused thereby. If, however, it is disposed at any other angle to the shaft then the racks are caused to travel longitudinally, the length of their travel being determined by the degree of angularity. By thus placing the member 77 the racks travel upon the gear 68 for a greater desired length of stroke as may be desired during the period of their engagement therewith, it being understood that the eccentric arrangement of the channel 64 will cause these racks to be withdrawn from engagement with the gear during a greater portion of their rotation. As in the previous construction, the ratio of drive depends upon the length of movement of the racks during this period of engagement, that is to say, upon their effective length, the examples in the illustration given above applying in the same way with this construction as that applied in the construction originally given. It will, of course, be understood that high gear in this construction is obtained at that point where the circular member 77 is at right angles to the shaft 57, the drive at this point being a one to one ratio.

In order that in this construction, as in the construction originally described, the racks may be permanently engaged with the gear during this high speed period the shiftability of the bearing member 59 has been provided. By moving this frame toward the frame 69, the reduced diameter of the channel is brought into alignment with the heads 66 of the racks 67 and the racks are all moved to a position where they engage the gear throughout the rotation thereof and are fixed and a one to one drive is thus provided, it being understood that during this shifting of the housing 59 and at the forward end of such shift the pins 60ª enter angular coves 60ᶜ of the channels 60ᵇ thereby causing the housing member to move diametrically of the casing and become concentric together with its associated parts to the shaft 58. Any suitable means may be provided for shifting the bearing member 59. In the present instance I have shown one of the lugs 60 as projecting through the casing, as at 84, and having an angular portion 85 directed toward the shifting lever 80. The shifting lever 80 is provided with a slot 86 in which a pin 87 carried by the end of the angular portion 85 is engaged. This slot at that portion thereof aligning with the angular portion 85 when the member 77 is at right angles to the shaft 57 has an angular cove 88 into which the pin moves drawing the angular portion 85 in the direction of the arrow in Figure 11 and shifting the frame to align the reduced portion 65 of the channel 64 with the head 66. It will be seen that in this construction, as in the original construction, the locking of the racks with the gears at high speed is automatically accomplished.

A construction such as disclosed above may be readily produced and will not be excessively expensive due to the fact that the majority of parts employed in this construction are duplicates of one another. These parts may be arranged within a suitable oil-tight casing so that they may be run at all times submerged in oil and friction of the various parts thereby reduced. It will furthermore be obvious that by employing the principal construction hereinbefore set forth the device is capable of a considerable range of change and modification without in any manner departing from the spirit of my invention and I accordingly do not limit myself to such specific structure except as hereinafter claimed.

I claim:—

1. In a transmission, a drive shaft, a driven shaft, a gear on the driven shaft, a plurality of racks associated with the gear, means connecting the racks and drive shaft for rotating the racks about the gear and for shifting the racks across the gear, adjustable to vary the length of shift of the racks across the gear, and means for successively engaging the racks with the gear during a predetermined period of each rotation about the gear and disengaging the racks from the gear during the remainder of such rotation adjustable to maintain said racks out of engagement with the gear during the entire rotation of the racks about the gear.

2. In a transmission, a drive shaft, a driven shaft, a gear on the driven shaft, a plurality of racks associated with the gear, means connecting the racks and drive shaft for rotating the racks about the gear and for shifting the racks across the gear, adjustable to vary the length of shift of the racks across the gear, means for successively engaging the racks with the gear during a predetermined period of each rotation about the gear and disengaging the racks from the gear during the remainder of such rotation, and means for rendering the last named means inoperative to disengage engaged racks from the gear at a selected ratio of drive from the drive to the driven shaft.

3. In a transmission, a drive shaft, a driven shaft, a gear on the driven shaft, a plurality of racks associated with the gear, means connecting the racks and drive shaft for rotating the racks about the gear and for shifting the racks across the gear, adjustable to vary the length of shift of the racks across the gear, and means for successively engaging the racks with the gear during a perdetermined period of each rotation about the gear and disengaging the racks from the gear during the remainder of such rotation including a sleeve normally eccentric to the gear and with which the racks are operatively connected, the connections between said sleeve and said racks being such that when the sleeve is concentrically disposed with relation to the shaft all of the racks are disengaged from the gear and means for so disposing said sleeve.

4. In a transmission, a drive shaft, a driven shaft, a gear on the driven shaft, a plurality of racks associated with the gear, means connecting the racks and drive shaft for rotating the racks about the gear and for shifting the racks across the gear, adjustable to vary the length of shift of the racks across the gear, means for successively engaging the racks with the gear during a predetermined period of each rotation about the gear and disengaging the racks from the gear during the remainder of such rotation, and means for automatically rendering the last named means inoperative to disengage engaged racks upon the gear at a selected ratio of drive from the drive to the driven shaft.

5. In a transmission, a drive shaft, a driven shaft, a gear on the driven shaft, a frame surrounding the gear, a plurality of racks carried by the frame, means for shifting the frame from a point concentric to the gear to a point eccentric thereto, means connecting the frame and drive shaft for rotating the frame, and means for engaging each of the racks with the gear during a predetermined period of the travel of the frame about the gear.

6. In a transmission, a drive shaft, a driven shaft, a gear on the driven shaft, a frame surrounding the gear, a plurality of racks carried by the frame, means for shifting the frame from a point concentric to the gear to a point eccentric thereto, means connecting the frame and drive shaft for rotating the frame, and means for engaging each of the racks with the gear during a predetermined period of the travel of the frame about the gear adjustable to disengage all of the racks from the gear throughout their rotation about the gear.

7. In a transmission, a drive shaft, a driven shaft, a gear on the driven shaft, a frame surrounding the gear, a plurality of racks carried by the frame, means for shifting the frame from a point concentric to the gear to a point eccentric thereto, means connecting the frame and drive shaft for rotating the frame, means for engaging each of the racks with the gear during a predetermined period of the travel of the frame about the gear including a normally fixed sleeve eccentric to the gear and operative connections between each of said racks and the sleeve, and means for releasing such sleeve for rotation with the frame to thereby permit engaged racks to remain engaged throughout the rotation of the frame about the gear.

8. In a transmission, a drive shaft, a driven shaft, a gear on the driven shaft, a frame surrounding the gear, a plurality of racks carried by the frame, means for shifting the frame from a point concentric to the gear to a point eccentric thereto, means connecting the frame and drive shaft for rotating the frame, means for engaging each of the racks with the gear during a predetermined period of the travel of the frame about the gear including a normally fixed sleeve eccentric to the gear and operative connections between each of said racks and the sleeve, means for releasing such sleeve for rotation with the frame to thereby permit engaged racks to remain engaged throughout the rotation of the frame about the gear, and means for shifting the sleeve from an eccentric to a concentric position with relation to said gear.

9. In a transmission, a drive shaft, a driven shaft, a gear on the driven shaft, a plurality of racks associated with the gear, means connecting the racks and drive shaft for rotating the racks about the gear and for shifting the racks across the gear, adjustable to vary the length of shift of the racks across the gear, means for successively engaging the racks with the gear during a predetermined period of each rotation about the gear and disengaging the racks from the gear during the remainder of such rotation adjustable to maintain said racks out of engagement with the gear during the entire rotation of the racks about the gear, and means preventing return of the last named means when adjusted to maintain the racks out of engagement with the gear to a point where it permits engagement of the racks with the gear until the means for shifting the racks is adjusted to a position where the shift of the racks across the gear is equal to the distance which the racks travel about the gear during the period of engagement.

10. In a transmission, a drive shaft, a driven shaft, a gear on the driven shaft, a frame surrounding the gear, a plurality of racks carried by the frame, means for shifting the frame from a point concentric to the gear to a point eccentric thereto, comprising a casing into which said drive and driven shafts extend at opposite sides, bearing rings shiftably mounted in the casing at such sides and surrounding the gears, each of said bearing rings embodying a flange, an eccentric strap associated with each flange, an eccentric operating within each strap, a common operating shaft for said eccentrics, means connecting the frame and drive shaft for rotating the frame, and means for engaging each of the racks with the gear during a predetermined period of the travel of the frame about the gear.

11. In a transmission, a drive shaft, a driven shaft, a gear on the driven shaft, a frame surrounding the gear, a plurality of racks carried by the frame, means for shifting the frame from a point concentric to the gear to a point eccentric thereto, comprising a casing into which said drive and driven shafts extend at opposite sides, bearing rings shiftably mounted in the casing at such sides and surrounding the gears, each of said bearing rings embodying a flange, an eccentric strap associated with each flange, an eccentric operating within each strap, a common operating shaft for said eccentrics, means connecting the frame and drive shaft for rotating the frame, means for engaging each of the racks with the gear during a predetermined period of the travel of the frame about the gear, comprising a sleeve normally eccentric to said shafts and extending into the frame, and operative connections between said sleeve and each of said racks whereby the racks are engaged with the gear during such predetermined period of travel and completely disengaged therefrom during the remainder of the travel about the gear.

12. In a transmission, a drive shaft, a driven shaft, a gear on the driven shaft, a frame surrounding the gear, a plurality of racks carried by the frame, means for shifting the frame from a point concentric to the gear to a point eccentric thereto, comprising a casing into which said drive and driven shafts extend at opposite sides, bearing rings shiftably mounted in the casing at such sides and surrounding the gears, each of said bearing rings embodying a flange, an eccentric strap associated with each flange, an eccentric operating within each strap, a common operating shaft for said eccentrics, means connecting the frame and drive shaft for rotating the frame, means for engaging each of the racks with the gear during a predetermined period of the travel of the frame about the gear, comprising a sleeve normally eccentric to said shafts and extending into the frame, operative connections between said sleeve and each of said racks whereby the racks are engaged with the gear during such predetermined period of travel and completely disengaged therefrom during the remainder of the travel about the gear, said sleeve when in concentric position maintaining all of said racks out of engagement with the gear during the entire rotation of the frame about the gear, and means for moving said sleeve to a concentric position with relation to the shaft.

13. In a transmission, a drive shaft, a driven shaft, a gear on the driven shaft, a frame surrounding the gear, a plurality of racks carried by the frame, means for shifting the frame from a point concentric to the gear to a point eccentric thereto, comprising a casing into which said drive and driven shafts extend at opposite sides, bearing rings shiftably mounted in the casing at such sides and surrounding the gears, each of said bearing rings embodying a flange, an eccentric strap associated with each flange, an eccentric operating within each strap, a common operating shaft for said eccentrics, means connecting the frame and drive shaft for rotating the frame, means for engaging each of the racks with the gear during a predetermined period of the travel of the frame about the gear, comprising a sleeve normally eccentric to said shafts and extending into the frame, operative connections between said sleeve and each of said racks whereby the racks are engaged with the gear during such predetermined period of travel and completely disengaged therefrom during the remainder of the travel about the gear, said sleeve when in concentric position maintaining all of said racks out of engagement with the gear during the entire rotation of the frame about the gear, means for moving said sleeve to a concentric position with relation to the shaft, including a member in which said sleeve is supported shiftable toward and away from the shaft, the member having a flange, and a lever connected with the flange for shifting the member toward and away from the shaft.

14. In a transmission, a drive shaft, a driven shaft, a gear on the driven shaft, a frame surrounding the gear, a plurality of racks carried by the frame, means for shifting the frame from a point concentric to the gear to a point eccentric thereto, comprising a casing into which said drive and driven shafts extend at opposite sides, bearing rings shiftably mounted in the casing at such sides and surrounding the gears, each of said bearing rings embodying a flange, an eccentric strap associated with each flange, an eccentric operating within each strap, a common operating shaft for said eccentrics, means connecting the frame and drive shaft for rotating the frame, means for engaging each of the racks with the gear during a predetermined period of the travel of the frame about the gear, comprising a sleeve normally eccentric to said shafts and extending into the frame, operative connections between said sleeve and each of said racks whereby the racks are engaged with the gear during such predetermined period of travel and completely disengaged therefrom during the remainder of the travel about the gear, said sleeve when in concentric position maintaining all of said racks out of engagement with the gear during the entire rotation of the frame about the gear, means for moving said sleeve to a concentric position with relation to the shaft, including a member in which said sleeve is supported shiftable toward and away from the shaft, the member having a flange, a lever connected with the flange for shifting the member toward and away from the shaft, said sleeve being rotatably mounted in said member, and a latch carried by the member and normally engaging the sleeve to maintain the same against rotation.

15. In a transmission, a drive shaft, a driven shaft, a gear on the driven shaft, a frame surrounding the gear, a plurality of racks carried by the frame, means for shifting the frame from a point concentric to the gear to a point eccentric thereto, comprising a casing into which said drive and driven shafts extend at opposite sides, bearing rings shiftably mounted in the casing at such sides and surrounding the gears, each of said bearing rings embodying a flange, an eccentric strap associated with each flange, an eccentric operating within each strap, a common operating shaft for said eccentrics, means connecting the frame and drive shaft for rotating the frame, means for engaging each of the racks with the gear during a predetermined period of the travel of the frame about the gear, comprising a sleeve normally eccentric to said shafts and extending into the frame, operative connections between said sleeve and each of said racks whereby the racks are engaged with the gear during such predetermined period of travel and completely disengaged therefrom during the remainder of the travel about the gear, said sleeve when in concentric position maintaining all of said racks out of engagement with the gear during the entire rotation of the frame about the gear, means for moving said sleeve to a concentric position with relation to the shaft, including a member in which said sleeve is supported shiftable toward and away from the shaft, the member having a flange, a lever connected with the flange for shifting the member toward and away from the shaft, said sleeve being rotatably mounted in said member, a latch carried by the member and normally engaging the sleeve to maintain the same against rotation, and means carried by said frame and coacting with the latch maintaining the latch engaged while the frame is eccentric to the gear and releasing the latch when the frame is concentric to the gear.

16. In a transmission, a drive shaft, a driven shaft, a gear on the driven shaft, a frame surrounding the gear, a plurality of racks carried by the frame, means for shifting the frame from a point concentric to the gear to a point eccentric thereto, means connecting the frame and drive shaft for rotating the frame, means for engaging each of the racks with the gear during a predetermined period of the travel of the frame about the gear including a normally fixed sleeve eccentric to the gear and operative connections between each of said racks and the sleeve, and means for releasing such sleeve for rotation with the frame to thereby permit engaged racks to remain engaged throughout the rotation of the frame about the gear operated by movement of the frame to a position where it is concentric to the shaft.

17. In a transmission, a drive shaft, a driven shaft, a gear on the driven shaft, a frame surrounding the gear, a plurality of racks carried by the frame, means for shifting the frame from a point concentric to the gear to a point eccentric thereto, means connecting the frame and drive shaft for rotating the frame, means for engaging each of the racks with the gear during a predetermined period of the travel of the frame about the gear including a normally fixed sleeve eccentric to the gear and operative connections between each of said racks and the sleeve, means for releasing such sleeve for rotation with the frame to thereby permit engaged racks to remain engaged throughout the rotation of the frame about the gear operated by movement of the frame to a position where it is concentric to the shaft, including a latch normally engaging the sleeve to prevent rotation thereof, a spring urging said latch out of engagement with the sleeve, and an abutment carried by the frame against which the latch engages to limit its movement, said abutment having a cove into which the engaged portion of the latch moves when the frame is concentric with the shaft.

18. In a transmission, a drive shaft, a driven shaft, a gear on the driven shaft, a frame surrounding the gear and embodying a plurality of elements paralleling the gear, a rack carried by each element, means for shifting the frame from a point concentric to the gear to a point eccentric thereto, a sleeve secured to the drive shaft, an angular arm on said sleeve having a slot receiving one of the elements of the frame, and means projecting into the frame for engaging each of said racks with the gear during a predetermined travel of the frame about the gear.

19. In a transmission, a drive shaft, a driven shaft, a gear on the driven shaft, a frame surrounding the gear, a plurality of racks carried by the frame, means for shifting the frame from a point concentric to the gear to a point eccentric thereto, means connecting the frame and drive shaft for rotating the frame, means for engaging each of the racks with the gear during a predetermined period of the travel of the frame about the gear, comprising a sleeve surrounding said driven shaft, and a support for said sleeve operable to position the sleeve eccentrically or concentrically to the shaft.

20. In a transmission, a drive shaft, a driven shaft, a gear on the driven shaft, a frame surrounding the gear, a plurality of racks carried by the frame, means for shifting the frame from a point concentric to the gear to a point eccentric thereto, means connecting the frame and drive shaft for rotating the frame, means for engaging each of the racks with the gear during a predetermined period of the travel of the frame about the gear, comprising a sleeve surrounding said driven shaft, a support for said sleeve operable to position the sleeve eccentrically or concentrically to the shaft, said sleeve being rotatably mounted in the support, means upon the support preventing rotation of the sleeve, and means carried by the frame and coacting with the last named means for automatically disengaging the last named means when the frame is positioned concentrically with relation to said shafts.

In testimony whereof I affix my signature.

JOSEPH ARNER.